Nov. 3, 1964

N. H. SHEPHERD 3,155,909

MOBILE COMMUNICATION SYSTEM IN WHICH THE BASE STATION RECEIVER, WHICH RECEIVES THE STRONGEST SIGNAL, IS AUTOMATICALLY SELECTED

Filed Oct. 31, 1961

2 Sheets-Sheet 1

INVENTOR
NEAL H. SHEPHERD

BY I. David Blumenfeld

ATTORNEY

INVENTOR
NEAL H. SHEPHERD
BY J. David Blumenfeld
ATTORNEY

United States Patent Office 3,155,909

Patented Nov. 3, 1964

3,155,909
MOBILE COMMUNICATION SYSTEM IN WHICH THE BASE STATION RECEIVER, WHICH RECEIVES THE STRONGEST SIGNAL, IS AUTOMATICALLY SELECTED

Neal H. Shepherd, Lynchburg, Va., assignor to General Electric Company, a corporation of New York Filed Oct. 31, 1961, Ser. No. 148,979
14 Claims. (Cl. 325—51)

This invention relates to communication systems and more particularly to communication systems which include fixed base or relay stations to retransmit a signal from a mobile unit to a central station.

In certain communication systems such as those employed along roadways, waterways, or pipelines, mobile radio units travel along the length of the system. These mobile units usually operate on relatively short wave lengths such as those in the (FM) frequency modulation communication bands. For reliable communications, this type of transmission is usually limited to line of sight operation. Further, due to the mobility of the transmitter units, the power of transmission is relatively low, which in turn limits the signal range. In order to compensate for this limited range of communication, several fixed base stations are placed along the "backbone" of the system and serve as relay units to re-transmit the signals either via wire or micro-wave back to a central station. In order to provide good communications between fixed or base stations and a mobile unit, it is desirable to provide a selecting means, which provide communications between the mobile unit and the particular fixed base station with which the best communication can be had at any particular time.

Therefore, a principal object of the invention is to provide an improved communication system of the type which employs mobile units in conjunction with a plurality of fixed relay or base stations comprising terminal stations at the beginning and end of the system and intermediate stations therebetween, together with an arrangement by which the base station receiver, which receives the strongest signal, will be voted to be automatically selected and used.

A further object of the invention is to provide an improved mobile communication system in which the choice of base station may be re-voted upon the mobile unit changing its location.

Yet another object of this invention is to provide a mobile communications system, having a plurality of fixed base stations in an arrangement such that at least one base station will relay received signals to a central station at all times when the system is operating.

A feature of this invention is the provision of a communication system for connecting a mobile transmitter unit to a central station through at least one of a plurality of base stations. In a "backbone" system, which is a preferred embodiment of this invention, there will be a terminal station at the beginning and end of the system and intermediate base stations therebetween. All stations include a receiver to receive a signal from the mobile transmitter, and a signal comparator means, which compares the signal received at a particular station with the received signals from adjacent stations, in order to provide an indication as to which station is receiving the strongest signals. A control means is provided at each station, which is responsive to the output of said comparator means at a predetermined level to operate means to connect the receiver receiving the strongest signals with a transmission means to convey the information to the central station.

Other objects, features and advantages of the invention will be apparent from the following detailed description which is accompanied by drawings in which.

Figure 1:
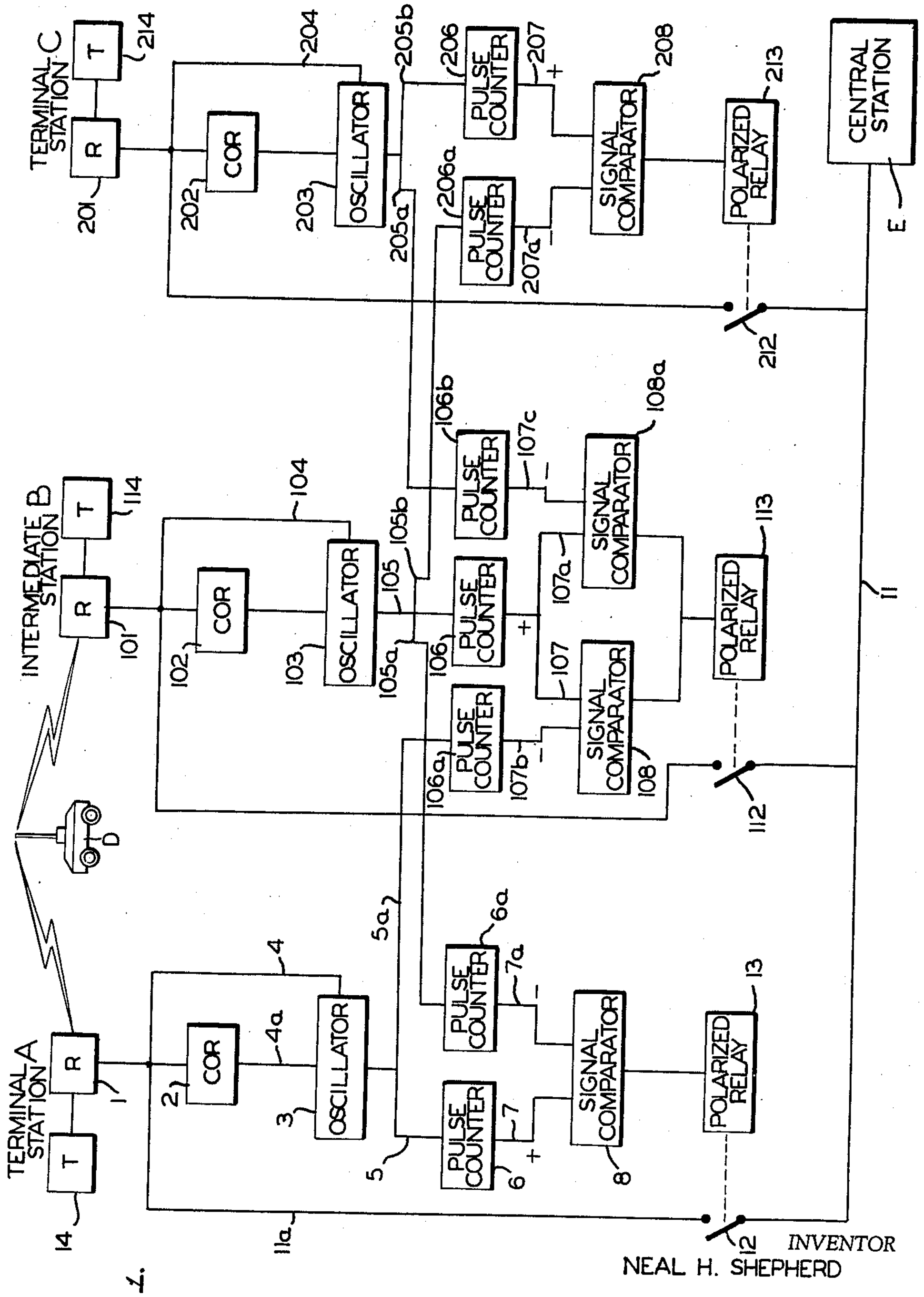
FIG. 1 is a block diagram of a "backbone" system with two terminal stations and an intermediate station with the components of the stations shown in block diagram form.

The operation of one embodiment of the present invention may best be understood by reference to FIG. 1, which illustrates a communication system of the "backbone" type with a first terminal station A, an intermediate station B, and a second terminal station C to relay signals to and from a mobile transmitter unit D and a central station E. Eeach station is equipped with a receiver correspondingly 1, 101, 201 to receive a signal from the mobile transmitter unit D. The automatic volume control circuit of the respective receivers provides a direct current voltage, which varies in amplitude in response to received signal levels, increasing with increased signal strength. Alternatively, the receivers may have other circuits such as limiter circuits or detection circuits from which a direct current signal varying in amplitude with received signal strength may be derived. The automatic volume control output of the receivers 1, 101, 201 operates respective control means such as carrier operated relays 2, 102, 202 at predetermined received signal levels. The carrier operated relays function to energize the respective oscillators 3, 103, and 203.

Figures 2, 3, 4:
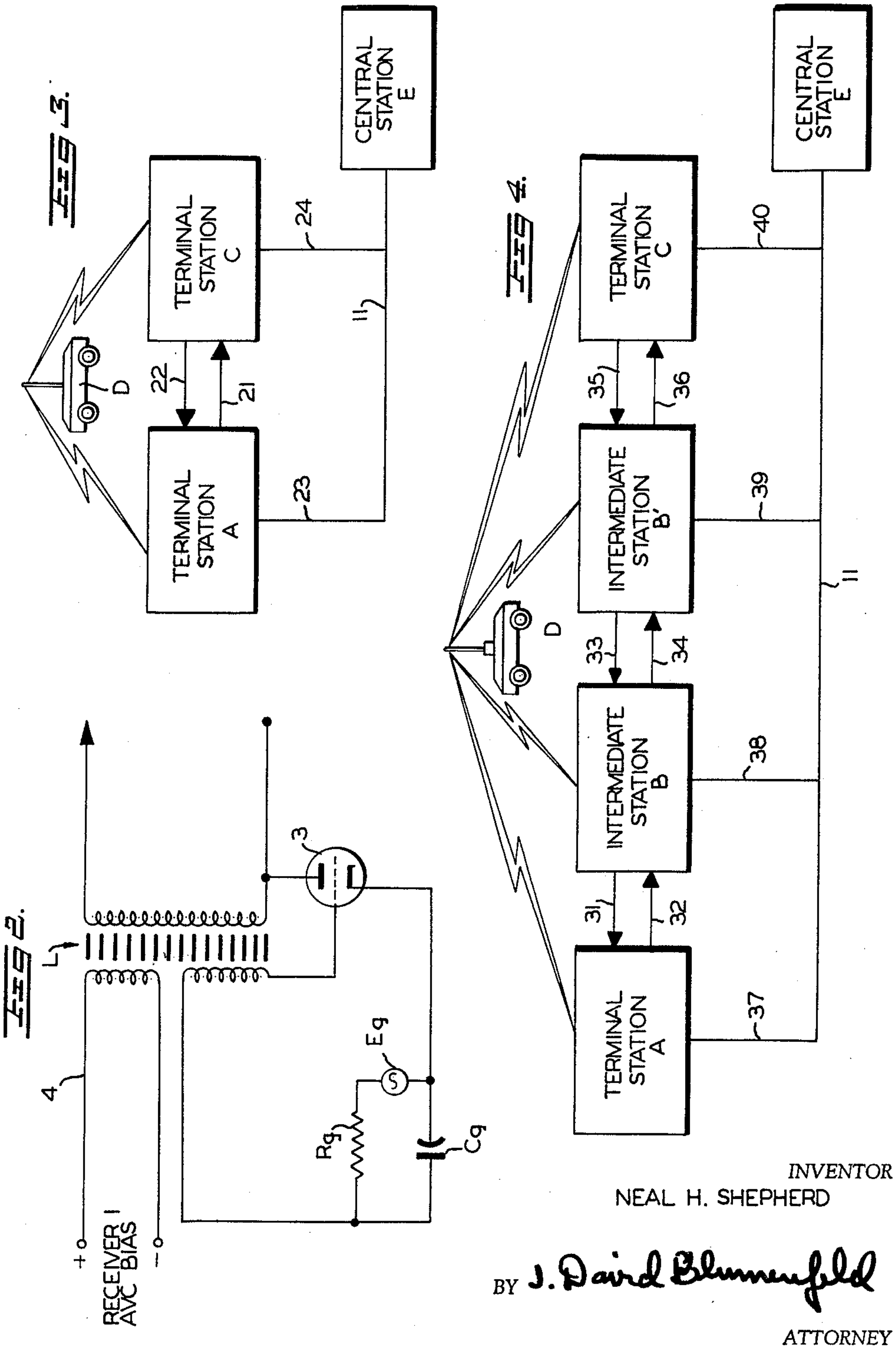
FIG. 2 is a circuit diagram of the oscillator circuit of a station oscillator producing a variable frequency signal output in response to a variable receiver automatic volume control direct current voltage.
FIG. 3 is a block diagram of a "backbone" system having only two base stations of terminal station arrangement as shown in detail in FIG. 1.
FIG. 4 is a block diagram of a four station "backbone" system with two intermediate stations and two terminal stations.

A detail circuit of one of the oscillators 3, 103 or 203 is shown by FIG. 2 of the drawings. As shown, the automatic volume control voltage from a receiver, such as receiver 1, is applied through conductor 4 to a saturable reactor L, constituting the coil in the oscillator circuit. The variable direct current voltage from the automatic volume control circuit of the receiver 1 will vary the impedance of the saturable reactor L, which in turn causes oscillator 3 to produce a variable frequency output, increasing in proportion to increases in receiving signal level.

As shown in FIG. 1, the automatic volume control signal from the respective station receiver units is connected via conducting means 4, 104, and 204 to the oscillators 3, 103 and 203. The frequency of the system may be any desirable frequency depending upon the specific application for which the system is to be used. In the arrangement shown by FIG. 1, the oscillators 3, 103 and 203 are represented as similar oscillators operating in the audio frequency range. Conducting means 5, 105 and 205 connect the variable frequency signal outputs from the respective station oscillators 3, 103 and 203 to respective pulse counters 6, 106 and 206. The output of these pulse counters is a varying amplitude direct current voltage, increasing in response to increases in oscillator frequencies, and is fed via conducting means 7, 107, **107*a* and 207 to respective signal comparator means 8, 108, 108*a* and 208**.

In order to determine which station is receiving the strongest signal from the mobile transmitter unit D, it is necessary to compare the signals received by a particular station with the signals received by an adjacent station. Therefore, the output of oscillator 3 is connected via conductor **5*a* to a pulse counter 106*a*** at station B. The variable direct current voltage output of the pulse counter 106a is connected to be of negative polarity relative to the variable direct current voltage output of pulse counter 106 and will be transmitted via 107b to signal comparator 108. The output of oscillator 103 is transmitted to pulse counter 6a at station A and 206a at station C, by means of conductors 105a and 105b respectively. The varying amplitude direct current voltage output of pulse counters 6a and 206a is connected to be negative relative to the direct current voltage outputs respectively of counters 6 and 206. Respective conductor means 7a and 207a will connect the direct current output voltages of counters 6a and 206a to signal comparator means 8 and 208. The output of oscillator 203 is transmitted via conductor means 205a to pulse counter 106b at station B. The variable direct current voltage output of pulse counter 106b is connected to be negative relative to the direct current output voltage of pulse counter 106, and will be compared with the signal from pulse counter 106 in the signal comparator 108a. It will be noted, that as compared to terminal stations A and C, the intermediate station B requires one additional pulse counter 106b and one additional comparator circuit 108a in order to compare signals from adjacent stations which in this case are the signals from stations A and C. Any additional intermediate stations in a "backbone" system, comprising a plurality of units will also have one more pulse counter and one more comparator circuit than a terminal station arrangement in order to compare the signals from immediately adjacent stations.

Central station E is connected to station receivers 1, 101 and 201 via respective switch means 12, 112, and 212 and conductors 11a, 11b, and 11c. Signals from respective station pulse counters are compared in both polarity and magnitude in respective station signal comparators 8, 108, 108a and 208. Signals from the comparator circuits 8, 108, 108a and 208 respectively are applied to respective control means such as polarized relays 13, 113, and 213 which are responsive to signals of a predetermined amplitude and polarity to control respective switches 12, 112, and 212. In the form of the circuit being described, the polarized relays 13, 113 and 213 are arranged to operate on a signal of positive polarity only.

In the communication system illustrated by FIG. 1, the mobile transmitter unit D is shown in a position between stations A and B so that only receivers 1 and 101 will receive signals of sufficient strength to operate carrier operated relays 2 and 102. That is, the "backbone" system shown by FIG. 1, a mobile transmitter D located between stations A and B will probably not send a signal of sufficient strength to station C to actuate the carrier operated relay 202 and in turn energize the station oscillator 203. The carrier operated relays energize oscillators 3 and 103. The variable frequency output of oscillator 3 is connected to pulse counters 6 and 106a producing a variable voltage output signal at 106a negative with respect to the variable voltage output signal at 6; while the output of oscillator 103 is connected to pulse counter 6a and 106 to produce a variable voltage output signal at 106 positive with respect to the variable voltage output signal at 6a. Voltages from respective pulse counters 6, 6a and 106, 106a are combined in comparator circuits 8 and 108 respectively. Additionally, the output voltage from the pulse counter 106 is also transmitted to comparator circuit 108a. Since oscillator 203 is not operating, there is no signal from station C to compare so that the output of signal comparator 108a will be some positive value depending upon the output voltage signal of counter 106. If the mobile transmitter unit D is positioned such that receiver 1 is receiving a stronger signal than receiver 101, then the output from signal comparator 8 will be of the predetermined amplitude and positive polarity to actuate polarized relay 13 thereby, closing switch 12 and connecting receiver 1 to central station E via transmission means 11.

If the mobile transmitter unit D is so close to station A that the signal received at station B is insufficient to actuate the carrier operated relay 102, there will be no signal output from oscillator 103 as it will not be energized. However, even though there is no signal from station B to compare with the signal from oscillator 3 in signal comparator 8, the polarized relay 13 will operate the switch means 12, if the output of signal comparator 8 is of the predetermined amplitude and positive polarity. However, as the mobile transmitter unit D continues to travel and approaches station B, the output of comparator circuit 8 may drop below the predetermined amplitude or become negative in nature to restore relay 13 and open switch 12, while the output of comparator circuits 108 and 108a at station B will combine to produce a signal of the predetermined positive polarity and amplitude to actuate relay 113 thereby, closing switch 112 connecting station B to central station E. Thus, a re-voting arrangement is provided whereby a signal from the mobile transmitter unit D will always be sent via the base station receiving the strongest signal.

It may well occur that the mobile transmitter unit D will reach a position between terminal station A and B such that they are receiving the signal equally. In this situation both polarized relays 13 and 113 will operate to connect stations A and B with central station E. There should preferably be an overlap period provided by the operate and release characteristics of the polarized relays during which more than one station will be transmitting the signal to the central station E. The overlap between the operation of adjacent relays should not be so great as to allow introduction of phase distortion, when adjacent stations are relaying signals to the central station E. The overlap arrangement will insure that at all times during the operation of the system at least one station will be connected to the central station.

The mobile transmitter unit D may continue to travel and reach a position, where all three stations are receiving a signal of sufficient strength so that the automatic volume control voltage output of the receivers 1, 101, and 201 will be sufficiently high to operate respective carrier operated relays 2, 102 and 202 and in turn energize respective oscillators 3, 103 and 203. The outputs of the respective oscillators will be transmitted via respective pulse counters as described above, which have a variable voltage direct current output signal, to be compared at signal comparators 8, 108, 108a and 208. If the output of both comparators 108 and 108a at the intermediate station B, when combined is still of the predetermined amplitude and polarity, then both polarized relay 13 and 113 will maintain respective switch means 12 and 112 closed and thereby continue the connection of receivers 1 and 101 with central station E. As the mobile station D moves closer to intermediate station B and the strength of the signal received at A drops below a predetermined level, polarized relay 13 will drop out leaving only polarized relay 113 operated to connect only intermediate station B to central station E.

When the mobile unit moves sufficiently close to station C, there then may be produced a change such that the output of signal comparator 208 will now reach the predetermined amplitude and positive polarity to operate the polarized relay 213, while the polarized relay 113 remains operated. As the mobile station D moves closer to terminal station C, polarized relay 113 will drop out leaving only polarized relay 213 operated to connect terminal station C to central station E. Thus the re-voting operation of the invention will have again taken place.

FIG. 3 is a block diagram in which there are only two relay stations A and C each being of the terminal station arangement as shown in detail in FIG. 1. In an arrangement such as this, it is necessary to have only two pulse counters at each terminal station and only one comparator circuit, as each station has only the signal from one adjacent station to compare with the signal received by the comparing station. Conductors 21 and 22 carry the signals from stations A and C respectively to be compared at the adjacent station. The conductors 23 and 24 will respectively connect A and C to transmission means 11 when either is receiving the stronger signal. Transmission means 11 connects the signal from the selected station to the central station E.

FIG. 4 shows a four station "backbone" system having two terminal stations A and C and two intermediate stations B and B[1]. These intermediate stations have the same circuit arrangement as the intermediate station B of FIG. 1; and as pointed out in the description of FIG. 1, an intermediate station has one additional pulse counter and one additional comparator circuit than a terminal station in order to be able to compare signals from adjacent stations to its immediate left and right. Conductors 31 and 36 carry the signals to be compared from adjacent respective stations. Conductors 37 through 40 connect the selected station receiving the strongest signal to the transmission means 11 which carries the signal from the selected station to the central station E.

It is to be noted here that the intermediate stations, in the embodiments described by FIGS. 1 and 4, have only one additional pulse counter and one additional comparator circuits as they are merely comparing signals from adjacent intermediate stations. However, it would be obvious to one skilled in the art that if it were desirable to compare signals from stations further along the line all that would be necessary would be to make interconnections between the station whose signal was to be compared and the intermediate station, and merely add another pulse counter and comparator circuit for each additional station signal to be compared. In an arrangement such as this, an intermediate station would always have one more pulse counter than signals being compared with its received signal and a comparator circuit arrangement in which the number of comparator circuits would always be equal to the number of signals being compared with the signals received at the given intermediate station.

It would also be obvious to one skilled in the art to use alternatives to the automatic volume control of a receiver to obtain a direct current signal which varies with received signal level. Such an arrangement might be the rectification of the output signal of the receiver itself. Further the system will obviously operate irrespective of whether there is a direct or inverse proportional relationship between the frequency output of the oscillators and the received signal level or between the frequency output of the oscillators and the variable direct current output of pulse counters or any other means for converting periodic signals into a variable direct current voltage. The polarized relays could be aranged so as to be responsive to a voltage of a particular amplitude and negative polarity rather than positive polarity. Instead of using the frequency of the output of the oscillator, it would be possible to use the amplitude of the oscillator in order to produce a variable direct current voltage which would be compared in the comparator circuits.

Although a particular embodiment of the subject invention has been described, many modifications may be made and it is understood to be the intention of the appended claims to cover all such modifications that fall within the true spirt and scope of the invention.

What I claim as new and desire to secure by Letters Patent of the United States is:

1. A system for selectively connecting a mobile transmitter unit to a central station through one of at least two base stations comprising, a first base station including a first station receiver to receive a signal from the mobile transmitter, a second base station including a second station receiver to receive a signal from the mobile transmitter, first means at said first station responsive to the received signal level of said first station receiver to produce a first comparison signal of one polarity having an amplitude proportional to the received signal level of said first station receiver, second means at said first station responsive to the signal level at said second station receiver to produce a second comparison signal of opposite polarity to said first comparison signal and having an amplitude proportional to the signal level at said second station receiver, comparator means at said first station connected to compare said first and second comparison signals, transmission means to connect the signal received at one of said base stations to a central station, and control means responsive to the output of said first station signal comparator at a predetermined amplitude and polarity to selectively connect said first station to said transmission means.

2. The system of claim 1, having a control means at said first station responsive to a predetermined minimum level of received signal level to operate said first and second means at any received signal level above said predetermined minimum level.

3. A system for selectively connecting a mobile transmitter unit to a central station through one of at least two base stations comprising, a first base station including a first station receiver to receive a signal from the mobile transmitter, a second station including a second station receiver to receive a signal from the mobile transmitter, first means at said first station responsive to said first station received signal level to produce a first comparison signal of one polarity having an amplitude proportional to said first station received signal level, second means at said first station responsive to said second station received signal level to produce a second comparison signal of opposite polarity to said first comparison signal and having an amplitude proportional to the second station received signal level, first station comparator means connected to compare said first and second comparison signals, third means at said second station responsive to said second station received signal level to produce a third comparison signal of one polarity having an amplitude proportional to the second station received signal, fourth means at said second station responsive to said first station received signal level to produce a fourth comparison signal of opposite polarity to said third comparison signal and having an amplitude proportional to said first station received signal level, second station comparator means connected to compare said third and fourth comparison signals, transmission means to connect the signal from at least one of said base stations to a central station, first control means responsive to the output of said first station signal comparator at a predetermined amplitude and polarity to connect said first station receiver to said transmission means, and second control means responsive to the output of said second station signal comparator at a predetermined amplitude and polarity to connect said second station receiver to said transmission means.

4. The system of claim 3, having a control means at said first station responsive to a predetermined minimum level of received signal level to operate said first and second means at any received signal level above said predetermined minimum level, and a control means at said second station responsive to a predetermined minimum level of received signal level to operate said third and fourth means at any received signal level above said predetermined level.

5. A system for selectively connecting a mobile transmitter to a central station through one of at least two base stations comprising, a first base station including a first station receiver to receive a signal from the moblie transmitter, said first station receiver having means to produce a first direct current signal varying in amplitude with the received signal level, a first station oscillator, first means connecting the first signal of said first station to said first station oscillator in a manner to produce a first periodic signal output varying in frequency proportional to the amplitude of said first direct current signal, a second base station including a second station receiver to receive a signal from the mobile transmitter, said second station receiver having means to produce a second direct current signal varying in amplitude with the received signal level, a second station oscillator, second means connecting the second signal of said second station to said second station oscillator in a manner to produce a second periodic signal output varying in frequency proportional to the amplitude of said second direct current signal, third means at said first station responsive to said first periodic signal to produce a first comparison signal of one polarity having an amplitude proportional to the frequency of said first periodic signal, fourth means at said first station responsive to said second periodic signal to produce a second comparison signal of opposite polarity to said first comparison signal and having an amplitude proportional to the frequency of said second periodic signal, first station comparator means connected to compare said first and second comparison signals, transmission means to connect the signal from at least one of said base stations to a central station, and control means responsive to the output of said first station comparator at a predetermined amplitude and polarity to selectively connect said first base station to said transmission means.

6. The system of claim 5, having a control means at said first station responsive to a predetermined minimum level of received signal level to energize said first station oscillator at any received signal level above said predetermined minimum level, and a control means at said second station responsive to a predetermined minimum level of received signal level to energize said second station oscillator at any received signal level above said predetermined minimum level.

7. A system for selectively connecting a mobile transmitter to a central station through one of at least two base stations comprising, a first base station including a first station receiver to receive a signal from the mobile transmitter, said first station receiver having means to produce a first direct current signal varying in amplitude with the received signal level, a first station ocillator, first means connecting the first signal of said first station to said first station oscillator in a manner to produce a first periodic signal output varying in frequency proportional to the amplitude of said first direct current signal, a second base station including a second station receiver to receive a signal from the mobile transmitter, said second station receiver having means to produce a second direct current signal varying in amplitude with the received signal level, a second station oscillator, second means connecting the second signal of said second station to said second station oscillator in a manner to produce a second periodic signal output varying in frequency proportional to the amplitude of said second direct current signal, third means at said first station responsive to said first periodic signal to produce a first comparison signal of one polarity having an amplitude proportional to the frequency of said first periodic signal, fourth means at said first station responsive to said second periodic signal to produce a second comparison signal of opposite polarity to said first comparison signal and having an amplitude proportional to the frequency of said second periodic signal, comparator means at said first station connected to compare said first and second comparison signals, fifth means at said second station responsive to said second periodic signal to produce a third comparison signal of one polarity having an amplitude proportional to the frequency of said second periodic signal, sixth means at said second station responsive to said first periodic signal to produce a fourth comparison signal of opposite polarity to said third comparison signal and having an amplitude proportional to the frequency of said first periodic signal, comparator means at said second station connected to compare said third and fourth comparison signals, transmission means to connect the signal from a selected one of said base stations to a central station, first control means responsive to the output of said first station comparator at a predetermined amplitude and polarity to connect said first station receiver to said transmission means, and second control means responsive to the output of said second station comparator at a predetermined amplitude and polarity to connect said second station receiver to said transmission means.

8. The system of claim 7, having a control means at said first station responsive to a predetermined minimum level of received signal level to energize said first station oscillator at any received signal level above said predetermined minimum level, and a control means at said second station responsive to a predetermined minimum level of received signal level to energize said second station oscillator at any received signal level above said predetermined minimum level.

9. A system for selectively connecting a mobile transmitter unit to a central station through one of at least three base stations comprising a first base station including a first station receiver to receive a signal from the mobile transmitter, a second base station including a second station receiver to receive a signal from the mobile transmitter, a third station including a third station receiver to receive a signal from the mobile transmitter, first means at said first station responsive to said first station received signal level to produce a first comparison signal of one polarity having an amplitude proportional to said first station received signal level, second means at said first station responsive to said second station received signal level to produce a second comparison signal of opposite polarity to said first comparison signal and having an amplitude proportional to the second station received signal level, first station comparator means connected to compare said first and second comparison signals, third means at said second station responsive to said second station received signal level to produce a third comparison signal of one polarity having an amplitude proportional to the second station received signal level, fourth means at said second station responsive to said first station received signal level to produce a fourth comparison signal of opposite polarity to said third comparison signal and having an amplitude proportional to said first station received signal level, fifth means at said second station responsive to said third station received signal level to produce a fifth comparison signal of opposite polarity to said third comparison signal and having an amplitude proportional to said third station received signal level, second station comparator means connected to compare said third, fourth and fifth comparison signals, sixth means at said third station responsive to said third station received signal level to produce a sixth comparison signal of one polarity having an amplitude proportional to said third station received signal level, seventh means at said third station responsive to said second station received signal level to produce a seventh comparison signal of opposite polarity to said sixth comparison signal and having an amplitude proportional to said second station received signal level, a third station comparator means connected to compare said sixth and seventh comparison signals, transmission means to connect the signal from at least one of said base stations to a central station, first control means responsive to the output of said first station signal comparator at a predetermined amplitude and polarity to connect said first station receiver to said transmission means, second control means responsive to the output of said second station signal comparator at a predetermined amplitude and polarity to connect said second station receiver to said transmission means, and third control means responsive to the output of said third station signal comparator at a predetermined amplitude and polarity to connect said third station receiver to said transmission means.

10. The system of claim 9, in which the second station comparator means comprises a first and second unit, said first unit connected to compare said third and fourth comparison signals, said second unit connected to compare said third and fifth comparison signals, and means connecting the output signals of said first and second units to said second control means.

11. The system of claim 9, having a control means at said first station responsive to a predetermined minimum level of received signal level to operate the first means at said first station and the fourth means at said second station, a control means at said second station responsive to a predetermined minimum level of received signal level to operate the third means at said second station and the second means at said first station, together with the seventh means at said third station, and a control means at said third station responsive to a predetermined minimum level of received signal level to operate the sixth means at said third station and the fifth means at said second station.

12. A system for selectively connecting a mobile transmitter to a central station through one of at least three base stations comprising, a first base station including a first station receiver to receive a signal from the mobile transmitter, said first station receiver having means to produce a first direct current signal varying in amplitude with the received signal level, a first station oscillator, first means connecting the first signal of said first station to said first station oscillator in a manner to produce a first periodic signal output varying in frequency proportional to the amplitude of said first direct current signal amplitude, a second station including a second station receiver to receive a signal from the mobile transmitter, said second station receiver having means to produce a second direct current signal varying in amplitude with the received signal level, a second station oscillator, second means connecting the second signal of said second station to said second station oscillator in a manner to produce a second periodic signal output varying in frequency proportional to the amplitude of said second direct current signal amplitude, a third base station including a third station receiver to receive a signal from the mobile transmitter, said third station receiver having means to produce a third direct current signal varying in amplitude with the received signal level, a third station oscillator, third means connecting the third signal of said third station to said third station oscillator in a manner to produce a third periodic signal output varying in frequency proportional to the amplitude of said third direct current signal amplitude, fourth means at said first station responsive to said first periodic signal to produce a first comparison signal of one polarity having an amplitude proportional to the frequency of said first periodic signal, fifth means at said first station responsive to said second periodic signal to produce a second comparison signal of opposite polarity to said first comparison signal and having an amplitude proportional to the frequency of said second periodic signal, comparator means at said first station connected to compare said first and second comparison signals, sixth means at said second station responsive to said periodic signal to produce a third comparison signal of one polarity having an amplitude proportional to the frequency of said second periodic signal, seventh means at said second station responsive to said first periodic signal to produce a fourth comparison signal of opposite polarity to said third comparison signal and having an amplitude proportional to the frequency of said first periodic signal, eighth means at said second station responsive to said third periodic signal to produce a fifth comparison signal of opposite polarity to said third comparison signal and having an amplitude proportional to the frequency of said third periodic signal, comparator means at said second station connected to compare said third, fourth and fifth comparison signals, ninth means at said third station responsive to said third periodic signal to produce a sixth comparison signal of one polarity having an amplitude proportional to the frequency of said third periodic signal, tenth means at said third station responsive to said second periodic signal to produce a seventh comparison signal of opposite polarity to said sixth comparison signal and having an amplitude proportional to the frequency of said second periodic signal, comparator means at said third station connected to compare said sixth and seventh comparison signals, transmission means to connect the signal from at least one of said base stations to a central station, first control means responsive to the output of said first station comparator at a predetermined amplitude and polarity to connect said first station receiver to said transmission means, second control means responsive to the output of said second station comparator at a predetermined amplitude and polarity to connect said second station receiver to said transmission means, and third control means responsive to the output of said third station comparator at a predetermined amplitude and polarity to connect said third station receiver to said transmission means.

13. The system of claim 12, in which the second station comparator means comprises a first and second unit, said first unit connected to compare said third and fourth comparison signals, said second unit connected to compare said third and fifth comparison signals, and means connecting the output signals of said first and second units to said second control means.

14. The system of claim 12, having a control means at said first station responsive to a predetermined minimum level of received signal level to energize said first station oscillator at any received signal level above said predetermined minimum level, a control means at said second station responsive to a predetermined minimum level of received signal level to enrgize said scond station oscillator at any received signal level above said predetermined minimum level, and a control means at said third station responsive to predetermined minimum level of received signal level to energize said third station oscillator at any received signal level above said predetermined minimum level.

References Cited by the Examiner

UNITED STATES PATENTS

| | | | |
|---|---|---|---|
| 2,985,755 | 5/61 | Giesselman | 325—304 |
| 3,045,185 | 7/62 | Mathmich | 343—176 |

DAVID G. REDINBAUGH, *Primary Examiner.*